(12) United States Patent
Ruehle et al.

(10) Patent No.: US 6,405,942 B1
(45) Date of Patent: Jun. 18, 2002

(54) FUEL INJECTOR WITH COMPENSATING SEALING ELEMENT

(75) Inventors: Wolfgang Ruehle, Ditzingen; Hubert Stier, Asperg; Matthias Boee, Ludwigsburg; Guenther Hohl, Stuttgart; Norbert Keim, Loechgau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/675,946

(22) Filed: Sep. 29, 2000

(30) Foreign Application Priority Data

Sep. 29, 1999 (DE) .......................... 199 46 603

(51) Int. Cl.⁷ ................................. B05B 1/08
(52) U.S. Cl. .................. 239/102.2; 239/102.1; 239/533.2; 239/533.3; 239/533.11; 239/585.1
(58) Field of Search .................. 239/102.1, 102.2, 239/533.2, 533.3, 533.11, 585.1

(56) References Cited

U.S. PATENT DOCUMENTS 5,836,521 A * 11/1998 Holm et al. ......... 239/102.2 X 6,085,990 A * 7/2000 Augustin ................ 239/584

FOREIGN PATENT DOCUMENTS

| DE | 40 05 455 | | 8/1990 | |
|----|-----------|---|--------|---|
| DE | 19843570 | * | 3/2000 | .............. 239/102.2 |
| DE | 19936942 | * | 2/2001 | .............. 239/102.2 |

* cited by examiner

Primary Examiner—Lesley D. Morris
Assistant Examiner—Robin O. Evans
(74) Attorney, Agent, or Firm—Kenyon & Kenyon

(57) ABSTRACT

A fuel injector, in particular an injection valve for fuel injection systems of internal combustion engines, has a piezoelectric actuator or magnetostrictive actuator sealed against a fuel by an actuator seal and it has a valve closing body actuatable by the actuator and working together with a valve seat face to form a tight seat. The actuator seal includes a sealing element on the inlet end and a sealing element on the injection end, both designed to be elastically deformable and frictionally engaged with an actuating sleeve. The actuator acts on valve closing body by way of the actuating sleeve, thus at least partially compensating the forces generated by the fuel pressure and acting on the actuator by way of the actuating sleeve.

13 Claims, 2 Drawing Sheets

FUEL INJECTOR WITH COMPENSATING SEALING ELEMENT

FIELD OF THE INVENTION

The present invention relates to a fuel injector.

BACKGROUND INFORMATION

German Published Patent Application No. 40 05 455 describes a fuel injector that includes an actuator arranged in an actuator chamber. The actuator chamber is sealed with an actuator seal in the form of a spring membrane with respect to a fuel chamber of the fuel injector into which fuel is added at a high pressure through a fuel inlet. The fuel pressure therefore applies a load on the actuator seal from the side of the fuel chamber, so that a force depending on the cross-sectional area of the actuator seal acts on the actuator.

The fuel injector described in German Published Patent Application No. 40 05 455 has the disadvantage that forces acting on the actuator seal from the fuel pressure are transferred completely to the actuator. In particular when there are pressure fluctuations, uncontrolled mechanical loads are applied to the actuator and can result in destruction of the actuator material and fluctuations in stroke.

Furthermore, when the actuator is actuated against the compressive force of the fuel, a high field energy is stored in the actuator and is dissipated when the actuator is reset, thus causing the actuator to heat up, so that suitable measures are to be taken to prevent overheating of the actuator.

SUMMARY OF THE INVENTION

The fuel injector according to the present invention has the advantage over the related art that force-balanced sealing of the actuator is achieved. Therefore, only a low actuator force is sufficient for actuating the fuel injector. In addition, fuel pressure fluctuations are compensated, thus preventing fluctuations in stroke.

It is advantageous that at least one sealing element has an inner metal ring connected to the actuating sleeve and an outer metal ring connected at least indirectly to a valve casing of the fuel injector. This provides a frictional connection which can withstand a high fuel pressure.

The inner metal ring is connected to the actuating sleeve with a peripheral weld in an advantageous manner. Furthermore, it is advantageous that the outer metal ring is connected to the valve casing with a peripheral weld. This permits stable and form-fitting connections that are easy to manufacture and are also resistant to fuel.

It is advantageous that the sealing element has a plastic element connected to the metal rings. This permits simple manufacture of the sealing element, where the sealing element can be adapted to specific uses of the fuel injector through the choice of the plastic element. For example, a large actuator stroke is made possible through the choice of an elastically deformable plastic element with a form-fitting connection.

The plastic element is connected to the metal rings by vulcanization in an advantageous manner. This yields a form-fitting connection of the metal ring to the plastic element which is easy to implement in terms of manufacturing technology.

It is advantageous that at least one sealing element has a membrane. This permits large adjusting motions.

Complete compensation of forces acting on the actuator through the actuating sleeve is achieved in an advantageous manner by way of a difference in cross-sectional areas of the sealing elements. Since the force transmitted from a sealing element to the actuating sleeve is obtained from the product of the fuel pressure multiplied by the cross-sectional area of the sealing element, the transmitted force can be changed by varying the cross-sectional area of the sealing element, while the cross-sectional area of the actuating sleeve remains the same. In this way, a force equilibrium acting on the actuating sleeve can be established.

It is advantageous that the actuating sleeve has a recess which is part of a fuel line leading from a fuel inlet of the fuel injector to the sealing seat. Therefore, the actuator seal also serves as part of a fuel line, thus saving on parts and yielding a more compact fuel injector design.

One end face of the actuator is in contact with a collar of the actuating sleeve in an advantageous manner. It is also advantageous that one end face of the actuator is in contact with a collar of the valve casing. Thus, there is an advantageous transmission of force of the actuator to the valve needle over the actuator seal.

DETAILED DESCRIPTION

Figure 1:
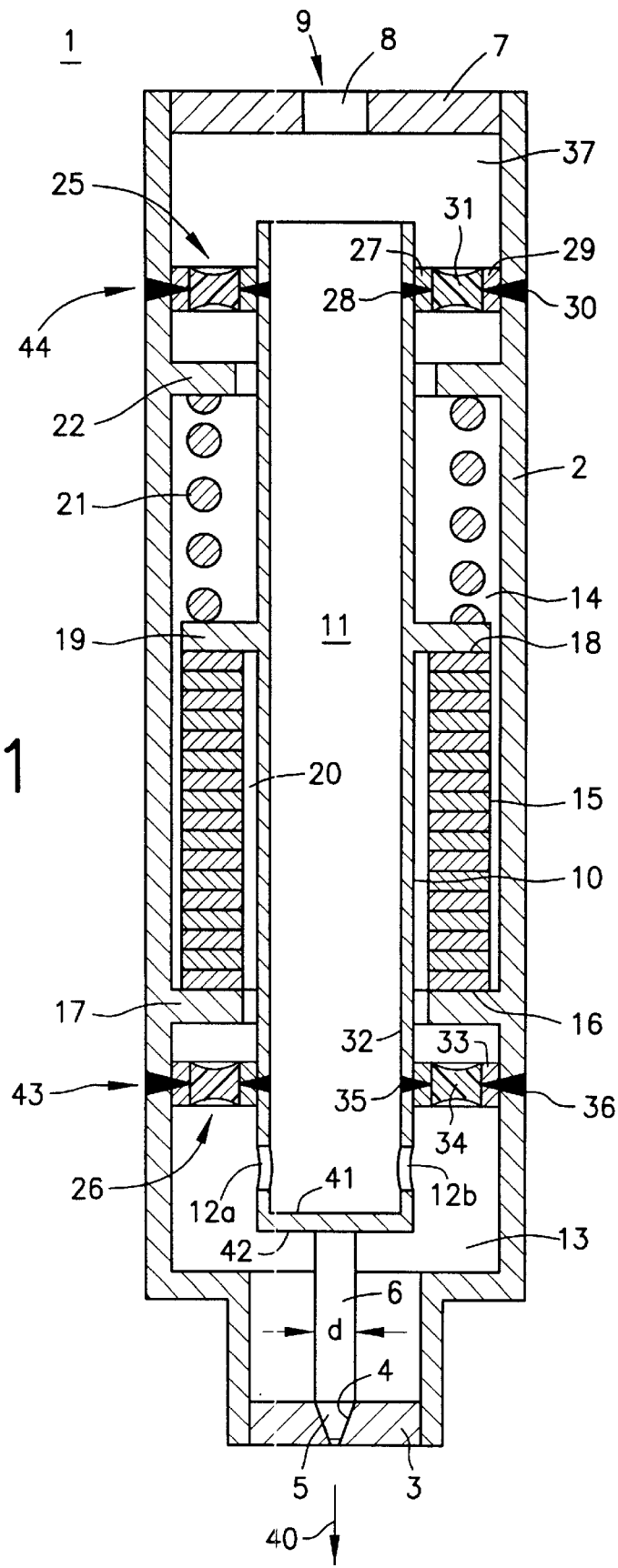
FIG. 1 shows an axial section through one embodiment of the fuel injector according to the present invention.

FIG. 1 shows a detail of an cross-sectional view of a fuel injector 1 according to the present invention. In this embodiment, fuel injector 1 is designed as an internally opening fuel injector 1. Fuel injector 1 is used in particular as a direct fuel injector for direct injection of fuel, gasoline in particular, into a combustion chamber of an internal combustion engine with compression of an air-fuel mixture and spark ignition. However, fuel injector 1 according to the present invention is also suitable for other applications.

Fuel injector 1 has a valve casing 2 connected to a valve seat body 3. A valve seat face 4 formed on valve seat body 3 works together with a valve closing body 5 to form a sealing seat. Valve closing body 5 is actuated by a valve needle 6 which is connected in one piece to valve closing body 5 in this embodiment. Valve casing 2 is also connected to a casing plate 7 having a recess 8, thus forming a fuel inlet 9 at the end.

Valve needle 6 is connected to an actuating sleeve 10 having an elongated recess 11 which is part of a fuel line leading from fuel inlet 9 of fuel injector 1 to the sealing seat formed by valve seat face 4 and valve closing body 5, so that fuel can flow from recess 11 into a fuel antechamber 13 through bores 12a, 12b.

A piezoelectric actuator or magnetostrictive actuator 15, for example, is arranged in an actuator chamber 14 of valve casing 2 of fuel injector 1, supported at a first end face 16 on a first collar 17 of valve casing 2 and at a second end face 18 on a collar 19 of actuating sleeve 10. Actuator 15 has a central recess 20 through which actuating sleeve 10 extends.

A prestress acts on actuator 15 by way of a closing spring 21 which is also in actuator chamber 14. At one end, closing spring 21 is supported by a second collar 22 of valve casing 2, and at the other end it is supported by collar 19 of actuating sleeve 10. In addition, valve closing body 5 is pressed into valve seat face 4 of valve seat body 3 by the prestress of closing spring 21.

Actuating sleeve 10 is connected to valve casing 2 by a sealing element 25 on the inlet end and a sealing element 26 on the injection end. Sealing element 25 on the inlet end has an inner metal ring 27 connected to actuating sleeve 10 by a peripheral weld 28, an outer metal ring 29 connected to valve casing 2 by a peripheral weld 30, and a plastic element 31 connected to metal rings 27, 29 by vulcanization. Sealing element 26 on the injection end is designed like sealing element 25 on the inlet end, and therefore it has an inner metal ring 32, an outer metal ring 33 and a plastic element 34 and is connected by welds 35, 36 to actuating sleeve 10 and valve casing 2.

Sealing elements 25, 26 together with actuating sleeve 10 form an actuator seal which seals actuator chamber 14 and thus actuator 15 against the fuel. The fuel pressure acts on sealing element 25 in a fuel chamber 37 on the inlet end, and a fuel pressure in fuel antechamber 13 acts on sealing element 26. Therefore, sealing element 25 transmits a force directed in direction of injection 40 to actuating sleeve 10, and sealing element 26 transmits a force opposite the latter force to actuating sleeve 10 such that the two forces completely compensate one another. Another force, directed in injection direction 40, is transferred to actuating sleeve 10 by fuel pressure acting on an inside face 41 of actuating sleeve 10. This force counteracts a force generated by fuel pressure acting on a lower end face 42 of actuating sleeve 10, with the area of end face 42 being smaller than inside face 41 by the cross-sectional area determined by seat diameter d. In this embodiment, fuel pressure acting on valve needle 6 does not produce any force component along injection direction 40, because valve needle 6 has a constant cross section in the area of fuel antechamber 13. Therefore, this yields a hydraulic closing force which acts in injection direction 40 and is determined by the fuel pressure and the cross-sectional area, which is in turn defined by the seat diameter.

Figure 2:
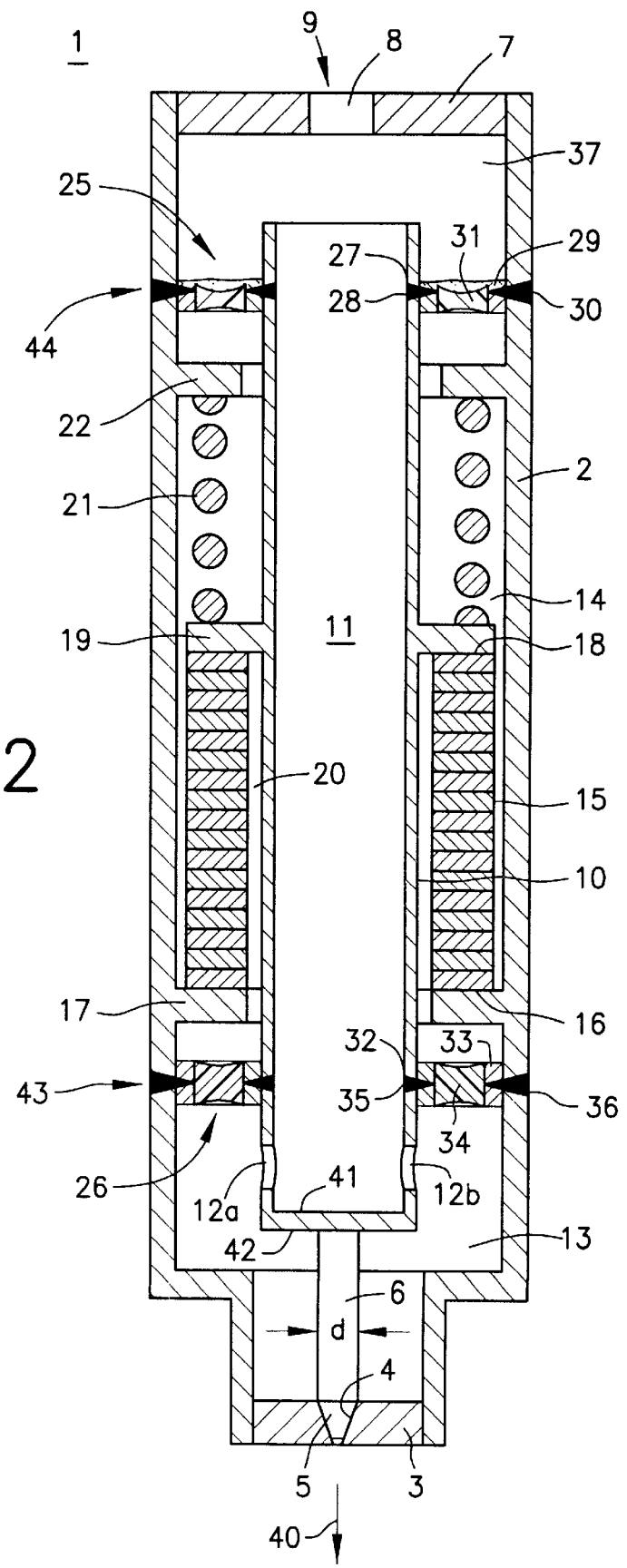
FIG. 2 shows an axial section through another embodiment of the fuel injector according to the present invention.

If valve casing 2 of fuel injector 1 is wider in area 43 of sealing element 26 on the injection end, thereby enlarging the outside diameter of sealing element 26, the force transmitted from sealing element 26 to actuating sleeve 10 against the injection direction 40 can be increased. If valve casing 2 is designed with a reduced diameter in area 44 of sealing element 25 on the inlet end, then the force transferred from sealing element 25 to actuating sleeve 10 in injection direction 40 may be reduced. If at least one of these measures is implemented, this yields a difference in cross-sectional areas 25, 26, so that complete compensation of the forces acting on actuator 15 by way of actuating sleeve 10 can be achieved. For example, if the hydraulic closing force mentioned above is to be compensated, at least one of the cross-sectional areas of sealing elements 25, 26 is adjusted as shown in FIG. 2 so that the cross-sectional area of sealing element 25 on the inlet end is smaller than the cross-sectional area of sealing element 26 on the injection end by the cross-sectional area defined by seat diameter d. It is also possible for a prestress to act on actuator 15 due to a difference in the cross-sectional areas of sealing elements 25, 26.

The present invention is not limited to the embodiment described here. In particular, the present invention is also suitable for an externally opening fuel injector 1. In addition, sealing elements 25, 26 may also be designed as O rings, quad rings, membranes or sliding rings.

What is claimed is:

1. A fuel injector, comprising:
  an actuating sleeve;
  an actuator seal including:
    a first sealing element arranged on an inlet end, and
    a second sealing element arranged on an injection end, the first sealing element and the second sealing element being elastically deformable and frictionally engaged with the actuating sleeve;
  one of a piezoelectric actuator and a magnetostrictive actuator sealed against a fuel by the actuator seal;
  a valve seat face; and
  a valve closing body that is actuatable by the one of piezoelectric actuator and the magnetostrictive actuator and that works together with the valve seat face to form a sealing seat, wherein:
  the one of the piezoelectric actuator and the magnetostrictive actuator acts on the valve closing body by way of the actuating sleeve to at least partially compensate a force generated by a fuel pressure and acting on the one of the piezoelectric actuator and the magnetostrictive actuator by way of the actuating sleeve.

2. The fuel injector according to claim 1, wherein:
  the fuel injector is an injection valve for a fuel injection system of an internal combustion engine.

3. The fuel injector according to claim 1, further comprising:
  a valve casing, wherein:
    at least one of the first sealing element and the second sealing element includes an inner metal ring connected to the actuating sleeve and an outer metal ring connected at least indirectly to the valve casing.

4. The fuel injector according to claim 3, further comprising:
  a peripheral weld by which the inner metal ring is connected to the actuating sleeve.

5. The fuel injector according to claim 3, wherein:
  the outer metal ring is connected to the valve casing by the peripheral weld.

6. The fuel injector according to claim 3, wherein:
  at least one of the first sealing element and the second sealing element includes a plastic element connected to the inner metal ring and the outer metal ring.

7. The fuel injector according to claim 6, wherein:
  the plastic element is connected to the inner metal ring and the outer metal ring by a vulcanization operation.

8. The fuel injector according to claim 1, wherein:
  at least one of the first sealing element and the second sealing element includes a membrane.

9. The fuel injector according to claim 1, wherein:
  a complete compensation of the force acting on the one of the piezoelectric actuator and the magnetostrictive actuator by way of the actuating sleeve is achieved due to a difference in a cross-sectional area of the first sealing element and a cross-sectional area of the second sealing element.

10. The fuel injector according to claim 9, wherein:
  the cross-sectional area of the first sealing element on the inlet end is smaller than the cross-sectional area of the second sealing element on the injection end by a cross-sectional area determined by a seat diameter to compensate for a hydraulic closing force.

11. The fuel injector according to claim 1, further comprising:
  a fuel inlet, wherein:
    the actuating sleeve includes a recess that is part of a fuel line leading from the fuel inlet to the sealing seat.

12. The fuel injector according to claim 1, wherein:
  the one of the piezoelectric actuator and the magnetostrictive actuator includes an end face that is in contact with a collar of the actuating sleeve.

13. The fuel injector according to claim 3, wherein:
  the one of the piezoelectric actuator and the magnetostrictive actuator includes an end face that is in contact with a collar of the valve casing.

* * * * *

UNITED STATES PATENT AND TRADEMARK OFFICE
CERTIFICATE OF CORRECTION

PATENT NO. : 6,405,942 B1
DATED : June 18, 2002
INVENTOR(S) : Wolfgang Ruehle et al.

It is certified that error appears in the above-identified patent and that said Letters Patent is hereby corrected as shown below:

<u>Title page, Item [54] and Column 1, lines 1 and 2,</u>
Change the title to read -- FUEL INJECTOR WITH COMPENSATING SEALING ELEMENTS --.

Signed and Sealed this

Twenty-sixth Day of August, 2003

JAMES E. ROGAN
*Director of the United States Patent and Trademark Office*